United States Patent
Fox et al.

(10) Patent No.: US 7,451,750 B1
(45) Date of Patent: Nov. 18, 2008

(54) CONDENSATION REDUCTION DEVICE FOR AN EGR EQUIPPED SYSTEM

(75) Inventors: Isaac Ethan Fox, East Peoria, IL (US); James Richard Weber, Lacon, IL (US); Dennis Lee Endicott, Hanna City, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/819,881

(22) Filed: Jun. 29, 2007

(51) Int. Cl.
*F02B 47/08* (2006.01)
*F02B 47/10* (2006.01)

(52) U.S. Cl. .............................................. 123/568.12
(58) Field of Classification Search ............ 123/568.12, 123/590, 563, 25 G, 25 H, 525, 527
See application file for complete search history.

(56) References Cited

U.S. PATENT DOCUMENTS

| | | | |
|---|---|---|---|
| 3,512,511 A | 5/1970 | Rappolt | |
| 3,930,485 A | 1/1976 | Konomi | |
| 4,146,596 A | 3/1979 | Saito et al. | |
| 4,274,386 A | 6/1981 | Reyes | |
| 4,294,220 A * | 10/1981 | Yasuhara et al. | 123/568.11 |
| 5,685,281 A | 11/1997 | Li | |
| 5,915,354 A | 6/1999 | Ma | |
| 6,044,827 A * | 4/2000 | Pfaff et al. | 123/568.18 |
| 6,047,956 A | 4/2000 | Brazina | |
| 6,145,498 A | 11/2000 | Packard et al. | |
| 6,536,420 B1 | 3/2003 | Cheng | |
| 6,748,741 B2 | 6/2004 | Martin et al. | |
| 6,748,921 B1 | 6/2004 | Surges | |
| 6,796,296 B2 | 9/2004 | Kim | |
| 6,901,907 B2 | 6/2005 | Wijaya | |
| 6,928,979 B2 | 8/2005 | Chen | |
| 6,932,049 B2 | 8/2005 | Kim | |
| 7,028,663 B1 | 4/2006 | Kim | |
| 7,104,251 B2 | 9/2006 | Kim | |
| 7,185,626 B2 | 3/2007 | Huckelberry et al. | |
| 2002/0185117 A1 | 12/2002 | Algeri | |
| 2003/0037774 A1* | 2/2003 | Schweinzer et al. | 123/568.12 |
| 2003/0114978 A1* | 6/2003 | Rimnac et al. | 701/108 |
| 2004/0006978 A1* | 1/2004 | Beck et al. | 60/289 |
| 2004/0079079 A1* | 4/2004 | Martin et al. | 60/605.2 |
| 2006/0185364 A1* | 8/2006 | Chalgren et al. | 60/599 |
| 2006/0225697 A1 | 10/2006 | Huckelberry et al. | |

(Continued)

FOREIGN PATENT DOCUMENTS

WO   WO 2004/013486 A1   12/2004

OTHER PUBLICATIONS http://www.staticmixers.com/default.asp, p. 1, printed Jun. 16, 2007.

(Continued)

*Primary Examiner*—Mahmoud Gimie
(74) *Attorney, Agent, or Firm*—Finnegan, Henderson, Farabow, Garrett & Dunner

(57) ABSTRACT

A condensation reduction device for use with an engine is disclosed. The condensation reduction device may have a first body member configured to receive a flow of exhaust, and a reservoir in fluid communication with the first body member to collect condensate from the flow of exhaust. The condensation reduction device may further have a passageway in fluid communication with the reservoir to direct the collected condensate from the reservoir back into the flow of exhaust.

20 Claims, 3 Drawing Sheets

U.S. PATENT DOCUMENTS

2007/0039322 A1* 2/2007 Bering et al. .................. 60/599
2007/0056282 A1* 3/2007 Iwaszkiewicz ............... 60/599

OTHER PUBLICATIONS http://www.tornadofuelsaver.com/272/tornadofuelsaver/howitworks.php, pp. 1-2, printed Jun. 25, 2007.

U.S. Appl. No. 11/819,877, filed Jun. 29, 2007, "EGR Equipped Engine Having Condensation Dispersion Device," pp. 1-16, Figs. 1-6.

* cited by examiner

CONDENSATION REDUCTION DEVICE FOR AN EGR EQUIPPED SYSTEM

TECHNICAL FIELD

The present disclosure relates generally to an EGR equipped combustion system and, more particularly, to an EGR equipped combustion system having a condensation reduction device.

BACKGROUND

Internal combustion engines exhaust a complex mixture of air pollutants. These air pollutants are composed of solid particulate matter and gaseous compounds including nitrogen oxides (NOx). Due to increased attention on the environment, exhaust emission standards have become more stringent and the amount of solid particulate matter and gaseous compounds emitted to the atmosphere from an engine is regulated depending on the type of engine, size of engine, and/or class of engine.

One method that has been implemented by engine manufacturers to comply with the regulation of these engine emissions is exhaust gas recirculation (EGR). EGR systems recirculate exhaust gas by-products into the intake of an internal combustion engine. The exhaust gas, which is redirected to a cylinder of the engine, reduces the concentration of oxygen therein, thereby lowering the maximum combustion temperature within the cylinder. The lowered maximum combustion temperature slows the chemical reaction of the combustion process, thereby decreasing the formation of nitrogen oxides. In addition, some of the particulate matter entrained in the exhaust is burned upon reintroduction into the engine cylinder to further reduce the exhaust gas by-products.

Before the exhaust gas enters the engine cylinders, it must first be mixed with air and cooled to the proper temperature. To cool the mixture of air and exhaust, the mixture is directed through a heat exchanger. While in the heat exchanger and at locations downstream of the heat exchanger, moisture previously entrained in the air and exhaust mixture condenses on the relatively cool walls of the heat exchanger. Because of the presence of sulfur and nitrogen oxides in the exhaust, the condensate can be corrosive and potentially damaging to the heat exchanger, downstream passageways, and the engine. The condensate may also cause premature wear of the engine due to the condensate's mechanical interactions with the piston, piston rings, and engine valves as the pistons reciprocate and the valves open within the cylinders.

One way to minimize the damage caused by condensation is disclosed in U.S. Pat. No. 6,748,741 (the '741 patent) issued to Martin et al. on Jun. 15, 2004. Specifically, the '741 patent discloses a charge air condensation separation system for a turbocharged engine employing EGR. The separation system includes a turbocharger having a compressor providing charge air, with a charge air cooler connected to the compressor to cool the charge air. A charge air delivery duct is connected to an outlet of the charge air cooler, and a toroidal trap having an annular inlet is disposed in the charge air delivery duct. A swirl generator may be used to urge the condensate toward the walls of the charge air duct for subsequent trapping. The toroidal trap has a sump for collecting condensation internal to the toroidal trap. A drain line for removing condensation from the sump for expulsion to the atmosphere is connected to the trap, and a pump or other device for overcoming a pressure differential in the drain line is employed in certain embodiments.

Although the separation system of the '741 patent may help to minimize damage resulting from condensation-caused acid, it may be limited and result in poor engine emissions. Specifically, although condensate from the charge air may be removed from the system, condensate from the recirculated exhaust may be unrestricted. That is, moisture from the recirculated exhaust flow may still be allowed to condense within the duct work of the engine and, because the separation system only removes condensate from the charge air, the condensed liquid from the recirculated exhaust flow may travel unrestricted into and damage the engine. And, because the acid solution is mainly caused by sulfur compounds and nitrogen oxides in the recirculated exhaust flow, the condensate from the exhaust may be more damaging than the condensate from the charge air. Further, it has been shown that the introduction of well dispersed or atomized (i.e., not condensed) non-combustible fluid into the combustion chamber of an engine during operation may be helpful in reducing the amount of NOx produced by the engine. Thus, because the separation system of the '741 patent removes the fluid from the charge air flow rather than homogeneously redispersing it into the air flow, the NOx production of the engine may be excessive.

The disclosed condensation reduction device is directed to overcoming one or more of the problems set forth above.

SUMMARY OF THE DISCLOSURE

In one aspect, the present disclosure is directed to a condensation reduction device. The condensation reduction device may include a first body member configured to receive a flow of exhaust, and a reservoir in fluid communication with the first body member to collect condensate from the flow of exhaust. The condensation reduction device may further include a passageway in fluid communication with the reservoir to direct the collected condensate from the reservoir back into the flow of exhaust.

In another aspect, the present disclosure is directed to a method of re-dispersing condensate. The method may include generating a flow of exhaust, and mixing the flow of exhaust with air. The method may also include cooling the mixed flow of air and exhaust, and collecting condensate from the cooled and mixed flow of air and exhaust. The method may further include directing the collected condensate back into the cooled and mixed flow of air and exhaust prior to combustion of the cooled and mixed flow of air and exhaust.

DETAILED DESCRIPTION

Figure 1:
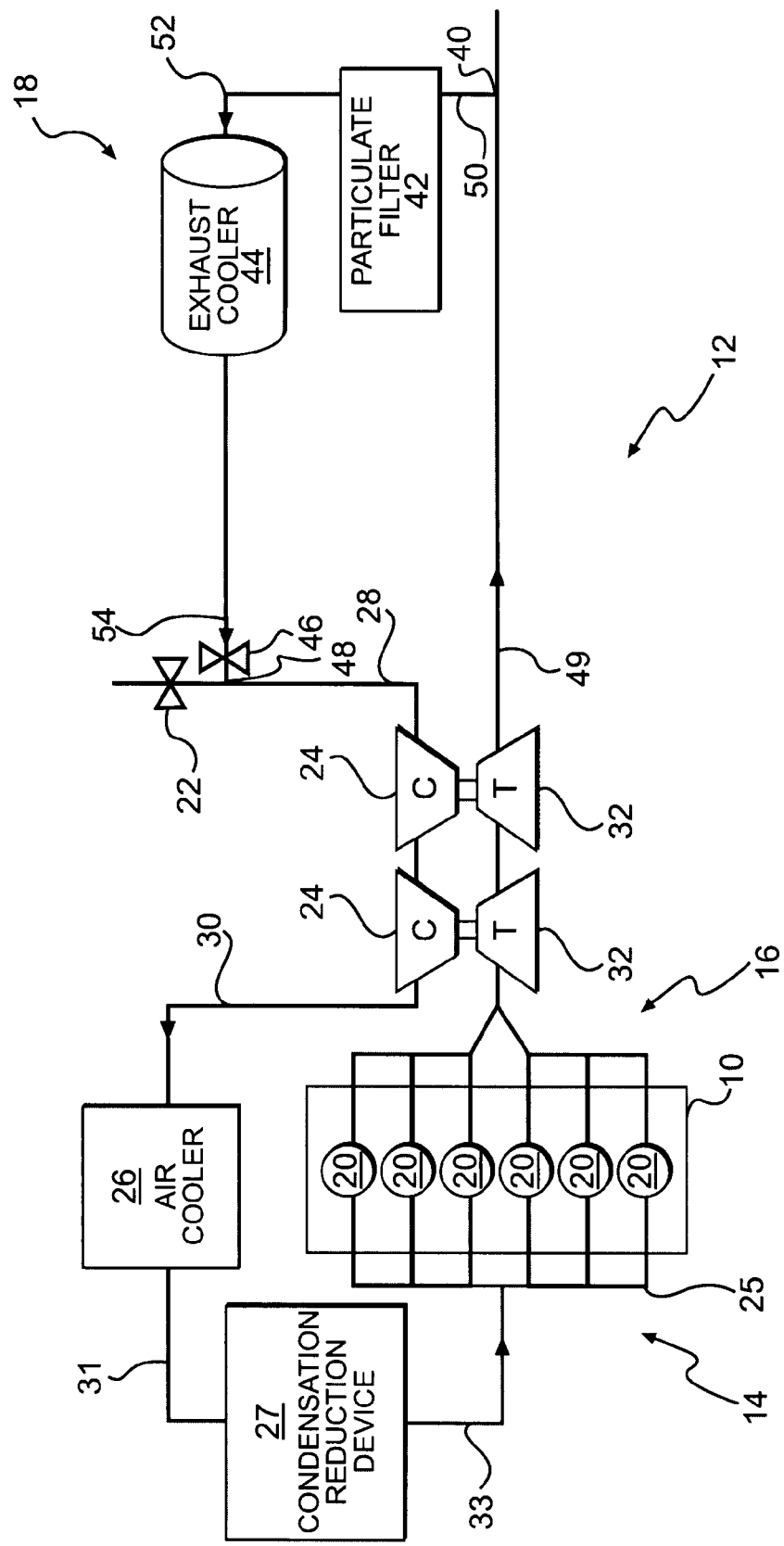
FIG. 1 is a diagrammatic illustration of an exemplary disclosed fluid handling system.

FIG. 1 illustrates an exemplary fluid handling system 12 for use with a power source 10. Power source 10 may include an engine, such as, for example, a diesel engine, a gasoline engine, a gaseous fuel-powered engine, such as a natural gas engine, or any other type of combustion engine apparent to one skilled in the art. It is also considered that power source 10 may alternatively include a furnace or similar non-engine device. Fluid handling system 12 may direct air into and exhaust away from power source 10, and may include an exhaust system 16, an EGR system 18, and an air induction system 14.

Exhaust system 16 may include a means for directing exhaust flow out of power source 10. For example, exhaust system 16 may include one or more turbines 32 fluidly communicated in a series relationship. Each turbine 32 may be connected to drive one or more compressors 24 of air induction system 14. In particular, as the hot exhaust gases exiting power source 10 expand against blades (not shown) of turbine 32, turbine 32 may rotate and drive the connected compressor 24. It is contemplated that turbines 32 may alternatively be disposed in a parallel relationship or that only a single turbine 32 may be included within exhaust system 16. It is also contemplated that turbines 32 may be omitted, if desired, and compressors 24 driven by power source 10 mechanically, hydraulically, electrically, or in any other manner known in the art.

EGR system 18 may include a means for redirecting a portion of the exhaust flow from exhaust system 16 into air induction system 14. For example, EGR system 18 may include an inlet port 40, a recirculation particulate filter 42, an exhaust cooler 44, a recirculation valve 46, and a discharge port 48. It is contemplated that EGR system 18 may include additional or different components, such as a catalyst, an electrostatic precipitation device, a shield gas system, one or more sensing elements, and/or other means for redirecting that are known in the art.

Inlet port 40 may be connected to exhaust system 16 to receive at least a portion of the exhaust flow from power source 10. Specifically, inlet port 40 may be disposed downstream of turbines 32 to receive low pressure exhaust gases from exhaust passageway 49. It is contemplated that inlet port 40 may alternatively be located upstream of turbines 32 for a high pressure recirculation application, if desired.

Recirculation particulate filter 42 may be connected to inlet port 40 via a fluid passageway 50 to remove particulates from the portion of the exhaust flow directed through inlet port 40. Recirculation particulate filter 42 may include electrically conductive or non-conductive coarse mesh elements. It is contemplated that recirculation particulate filter 42 may include a catalyst for reducing an ignition temperature of the particulate matter trapped by recirculation particulate filter 42, a means for regenerating the particulate matter trapped by recirculation particulate filter 42, or both a catalyst and a means for regenerating. The means for regenerating may include, among other things, a fuel-powered burner, an electrically-resistive heater, an engine control strategy, or any other means for regenerating known in the art. It is contemplated that recirculation particulate filter 42 may be omitted, if desired.

Exhaust cooler 44 may be fluidly connected to recirculation particulate filter 42 via a fluid passageway 52 to cool the portion of exhaust gases flowing through inlet port 40. Exhaust cooler 44 may include a liquid-to-air heat exchanger, an air-to-air heat exchanger, or any other type of heat exchanger known in the art for cooling an exhaust flow. It is contemplated that exhaust cooler 44 may be omitted, if desired.

Recirculation valve 46 may be fluidly connected to exhaust cooler 44 via a fluid passageway 54 to regulate the flow of cooled exhaust entering air induction system 14. Recirculation valve 46 may embody a butterfly valve, a gate valve, a ball valve, a globe valve, or any other valve known in the art. Recirculation valve 46 may be solenoid-actuated, hydraulically-actuated, pneumatically-actuated, or actuated in any other manner.

Air induction system 14 may include a means for introducing cooled and compressed air or an air and exhaust mixture into a combustion chamber 20 of power source 10. For example, air induction system 14 may include an induction valve 22, compressors 24, an air cooler 26, a condensation reduction device 27, and an intake manifold 25. It is contemplated that additional components may be included within air induction system 14, such as, for example, additional valving, one or more air cleaners, one or more waste gates, a control system, and other means for introducing charge air into combustion chambers 20 that are known in the art.

Induction valve 22 may be fluidly connected to compressors 24 via a fluid passageway 28 to regulate the flow of atmospheric air to power source 10. As atmospheric air enters induction valve 22, it may mix with the exhaust exiting discharge port 48, creating an air and exhaust mixture. Induction valve 22 may embody a butterfly valve, a gate valve, a ball valve, a globe valve, or any other type of valve known in the art. Induction valve 22 may be solenoid-actuated, hydraulically-actuated, pneumatically-actuated, or actuated in any other manner. It is contemplated that induction valve 22 and recirculation valve 46 may be combined into a single integral valve that performs the air and exhaust regulating and mixing functions, if desired.

Compressors 24 may compress the air and exhaust (or just air when recirculation valve 46 is closed) flowing into power source 10 to a predetermined pressure level. Each of compressors 24 may include a fixed geometry compressor, a variable geometry compressor, or any other type of compressor known in the art. Compressors 24 may be fluidly connected to air cooler 26 via fluid passageway 30 and may be disposed in a series relationship. It is contemplated that compressors 24 may alternatively be disposed in a parallel relationship or that air induction system 14 may include only a single compressor 24. It is further contemplated that compressors 24 may be omitted, when a non-pressurized induction system is desired.

Air cooler 26 may embody an air-to-air heat exchanger or an air-to-liquid heat exchanger and may facilitate the transfer of thermal energy to or from the air and exhaust mixture directed into power source 10. For example, air cooler 26 may include a shell and tube-type heat exchanger, a corrugated plate-type heat exchanger, a tube and fin-type heat exchanger, a bar-and-plate type heat exchanger, or any other type of heat exchanger known in the art. Air cooler 26 may be connected to condensation reduction device 27 via fluid passageway 31. It is contemplated that air cooler 26 may alternatively be located upstream of compressors 24, and/or that air induction system 14 may include two or more coolers located upstream and/or downstream of compressors 24.

Figure 2:
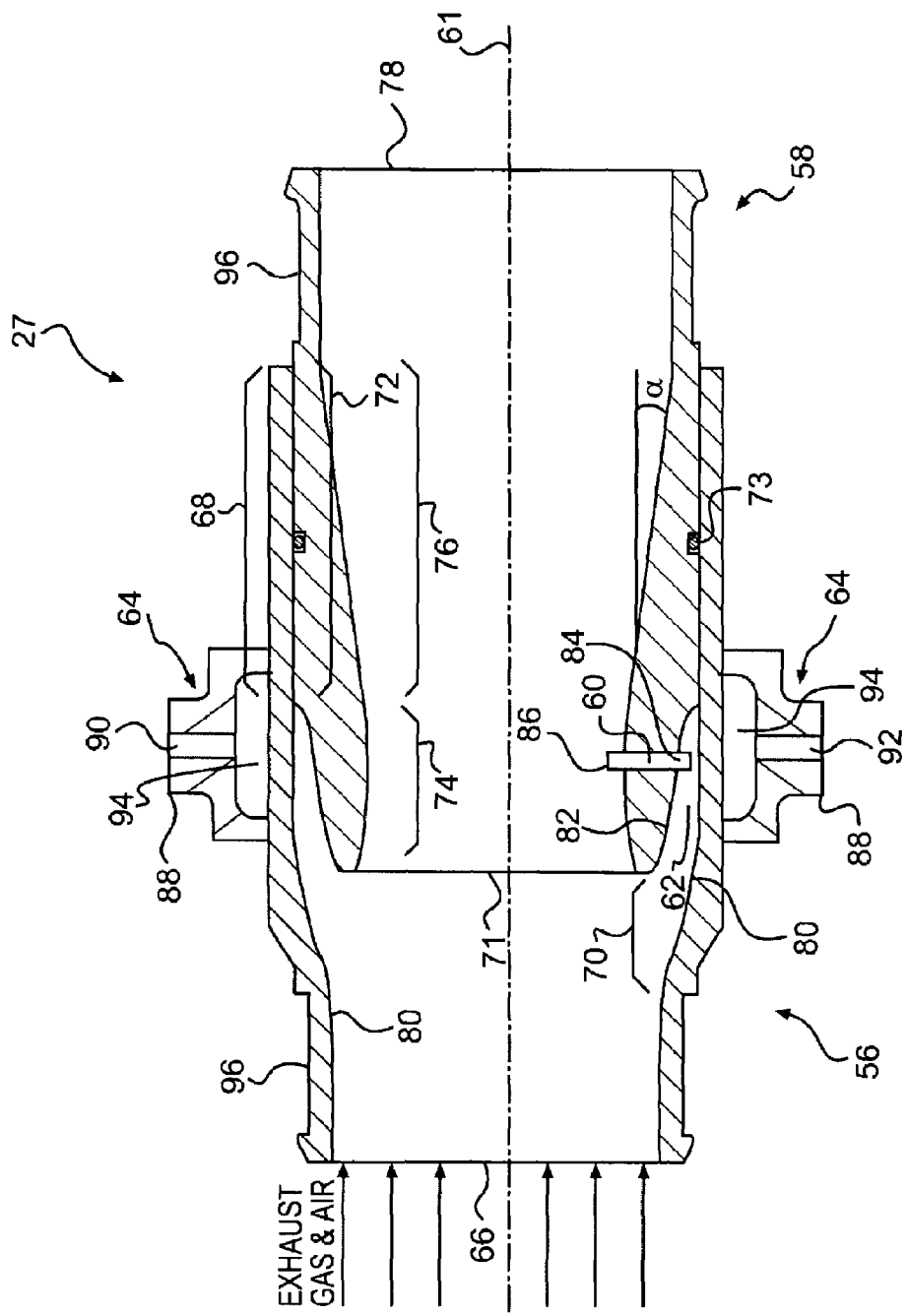
FIG. 2 is a cross sectional illustration of an exemplary disclosed condensation reduction device for use with the fluid handling system of FIG. 1.

As shown in FIG. 2, condensation reduction device 27 may include a means for atomizing and re-entraining condensed vapor (e.g., condensed water, sulfuric acid, nitric acid, etc.) into the charge air or air and exhaust flow before the fluid enters intake manifold 25 via fluid passageway 33 (see FIG. 1). Condensation reduction device 27 may include a first body 56, a second body 58, an annular reservoir 62, a passageway 60, and a heater 64.

First body 56 may be a hollow tubular member configured to receive and conduct a fluid (e.g., air, exhaust gas, or a mixture of air and exhaust) from passageway 31 to second body 58. First body 56 may include an inlet 66 configured to receive the air and exhaust gas mixture, an expanded section 70, and a coupling section 68. First body 56 may be manufactured from any appropriate material having anti-corrosion characteristics, such as, for example, stainless steel, aluminum, plastic, composite, or any other material known in the art. First body 56 may be machined, cast, molded, or formed in any other appropriate manner.

An inner diameter of first body 56 may increase at expanded section 70 relative to inlet 66 (i.e., inner diameter increases in the direction of fluid flow). Expanded section 70 may allow second body 58 to be received within first body 56. Expanded section 70 may be located at any axial location between inlet 66 and coupling section 68 of first body 56. The increase in inner diameter at expanded section 70 may be immediate (e.g., a step increase in diameter) or it may be gradual (e.g., a generally linear increase in diameter with respect to a central axis 61). A gradual increase in the inner diameter of first body 56 may help to prevent flow separation at expanded section 70, thus minimizing pressure loss.

Coupling section 68 of first body 56 may interface and/or connect with second body 58. For example, coupling section 68 may connect with second body 58 via a fastening member, such as, for example, a bolt, a screw, a dowel pin, or any other appropriate fastening member. It is also contemplated that coupling section 68 may be internally threaded, if desired.

Second body 58 may be located downstream of and in fluid communication with first body 56. Second body 58 may also be a hollow tubular member configured to receive and conduct a fluid (e.g., air, exhaust gas, or mixture of air and exhaust) from first body 56 to fluid passageway 33. Second body 58 may include an inlet 71, a coupling section 72, a throat section 74, an expanded section 76, and an outlet 78. Second body 58 may be manufactured from a corrosion resistant material, such as, for example, stainless steel, aluminum, plastic, composite, or any other material known or used in the art. Second body 58 may be machined, cast, molded, or formed in any other appropriate manner.

Figure 3:
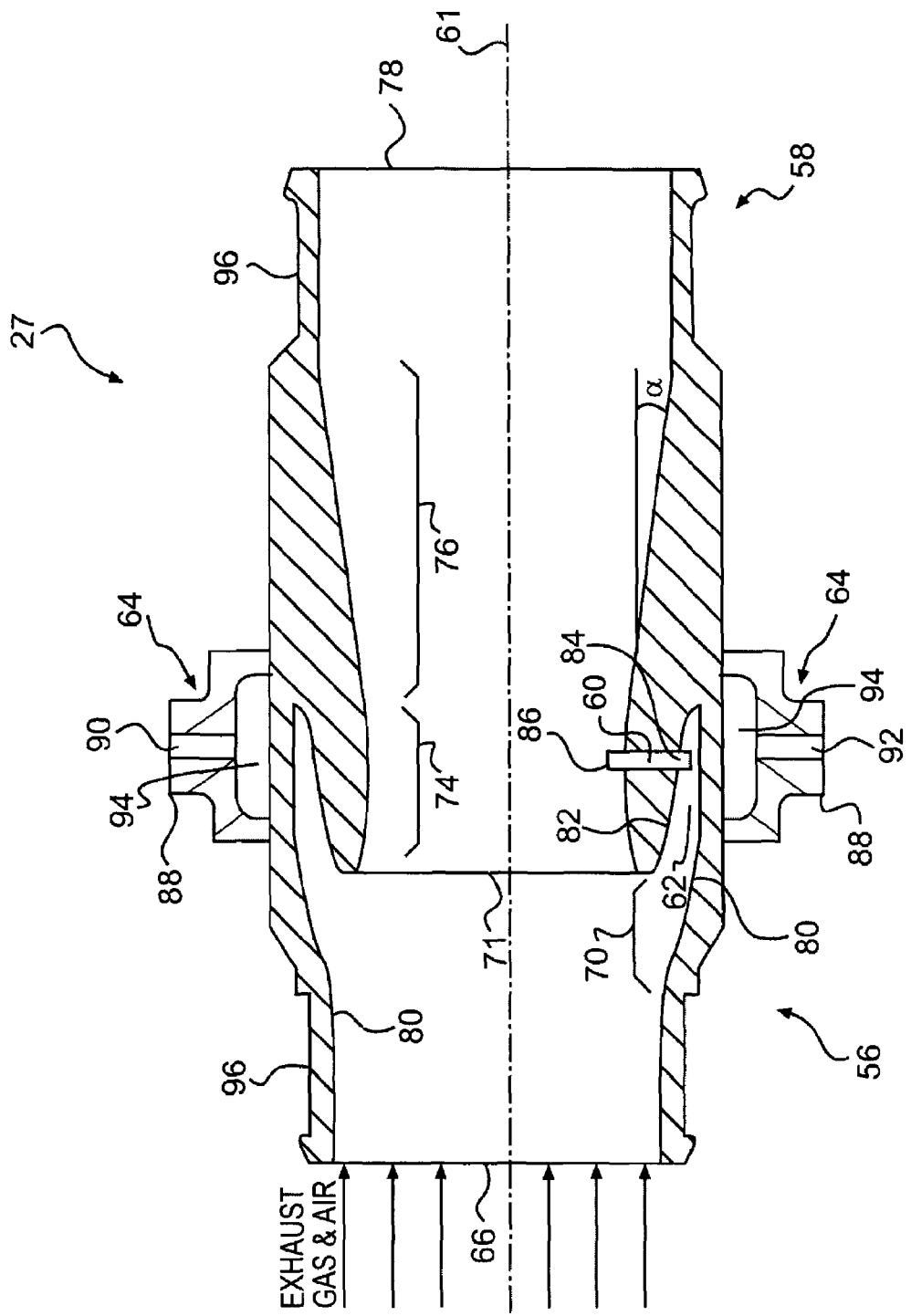
FIG. 3 is a cross sectional illustration of another exemplary disclosed condensation reduction device for use with the fluid handling system of FIG. 1

Coupling section 72 may interface and/or connect with coupling section 68 of first body 56. An outer diameter of second body 58 at coupling section 68 may be slightly smaller than the inner diameter of first body 56 at coupling section 72, such that the smaller diameter second body 58 may be axially received within the larger diameter of first body 56. It is contemplated that fastening members (not shown) may be used to join first and second bodies 56 and 58. It is also contemplated that coupling section 72 may be externally threaded such that it may be received by corresponding internal threads of coupling section 68. Coupling section 72 may alternatively be joined to coupling section 68 via welding, brazing, chemical bonding, or in any other manner known or used in the art. In another embodiment shown in FIG. 3, it is contemplated that coupling sections 68 and 72 may be omitted and first body 56 and second body 58 may be cast, injection molded or otherwise formed as a single integral part, if desired.

Referring to FIG. 2, A sealing member 73 may be located between coupling sections 68 and 72 to restrict the flow of air, exhaust gas, and/or condensate. Sealing member 73 may be an o-ring, a gasket, an adhesive substance, or any other appropriate sealing member known in the art. It is contemplated that multiple sealing members 73 may be used to restrict the flow of exhaust gas, air and/or condensate, if desired.

Throat section 74 may be a section of reduced internal diameter (i.e., a constriction), as compared to the internal diameter of first body 56 immediately upstream of expanded section 70. This reduced diameter section of second body 58 may cause a pressure decrease and a velocity increase of the air and exhaust mixture at throat section 74 relative to an upstream pressure and velocity. This decrease in pressure and increase in velocity of the air and exhaust mixture may provide a potential for enhanced mixing of fluid particles introduced from annular reservoir 62 into the mixture at throat section 74. It is contemplated that the reduction in the diameter of throat section 74 may be optimized to achieve a desired fluid pressure and velocity at throat section 74. It is also contemplated that, instead of modifying the internal diameter of second body 58 at throat section 74, a separate venturi tube or orifice plate may be located within the flow path to achieve a similar result, if desired.

Expanded section 76 may be a section where the internal diameter of second body 58 is increased relative to the internal diameter of second body 58 at throat section 74. The internal diameter at expanded section 76 may increase at a relatively constant angle, $\alpha$, along the axial length of expanded section 76. The increase in diameter of second body 58 at expanded section 76 may decrease the velocity and increase the pressure of the air and exhaust gas mixture. The angle $\alpha$ may be selected to avoid significant flow separation along expanded section 76 (separation may occur with a large value of $\alpha$), yet still achieve a compact design of condensation reduction device 27 (compact design may be difficult with a small value of $\alpha$). In one embodiment, a may be approximately 6 degrees. It is contemplated that the internal diameter of second body 58 at expanded section 76 may increase at a non-constant rate, if desired.

Both outlet 78 of second body 58 and inlet 66 of first body 56 may include a connecting element 96 for connecting condensation reduction device 27 to fluid passageways 33 and 31 of fluid handling system 12 (see FIG. 1), respectively. For example, connecting element 96 may embody an annular channel or notch in an outer surface of first body 56. Passageway 31 may be received by connecting element 96, and an annular band (not shown) may be tightened around an outer diameter of passageway 31 at the channeled location. The band may be tightened until passageway 31 deforms into the channel, thus securing passageway 31 in place. Passageway 33 may be secured to second body 58 in a similar fashion. It is contemplated that each connecting element 96 may alternatively embody a threaded connection, a flanged connection, or any other type of mechanical connection known in the art. It is further contemplated that a welded connection, an interference connection, a brazed connection, or any other appropriate connection may be used in place of connecting element 96, if desired.

Annular reservoir 62 may be situated to collect condensate flowing along an internal surface 80 of first body 56. A geometry of annular reservoir 62 may be at least partially defined by an external surface 82 of second body 58 and internal surface 80 of first body 56 at or near throat section 74. It is contemplated that annular reservoir 62 may alternatively be an annular trough or channel in internal surface 80 of first body 56 located at or upstream of throat section 74.

Passageway 60 may introduce or reintroduce condensate from annular reservoir 62 into the fluid stream passing through condensation reduction device 27. Passageway 60 may include an inlet 84 to receive condensate collected by annular reservoir 62. Because gravity may cause the condensate to pool at a bottom location of annular reservoir 62, inlet 84 may be located at or near the bottom (i.e., gravitationally lowest point) of annular reservoir 62. Passageway 60 may also include an outlet 86 to allow the condensate received via inlet 84 to be drawn by the low pressure at throat 74 into the flow of fluid. Passageway 60 may embody a hose, a duct, a pipe, or any other fluid carrying member known in the art. It is contemplated that passageway 60 may be routed in any appropriate pathway that commences at or near the bottom of annular reservoir 62 and terminates at throat section 74 of second body 58. For example, passageway 60 may be located in a wall of second body 58 at or near throat section 74 and may extend generally toward central axis 61 of second body 58. It is also contemplated that multiple passageways 60 may be used, if desired.

When the condensate is reintroduced into the flow of air and exhaust, heat from the air and exhaust gas mixture may help atomize the condensate. If needed, additional heat may be provided by heater 64. Heater 64 may be used to transmit thermal energy into the condensate collected within annular reservoir 62. Heater 64 may include a housing 88 defining an inlet port 90, an annular cavity 94, and a outlet port 92. Housing 88 may attach to first body 56 via mechanical fastening, welding, brazing, chemical bonding, or in any other appropriate manner. A heated fluid may pass into annular cavity 94 of housing 88 via inlet port 90. The heated fluid may then travel around annular cavity 94 and exit via outlet port 92. Thermal energy from the heated fluid may be conducted through first body 56 and transferred to the lower temperature condensate contained within annular reservoir 62, thus increasing the condensate's ability to atomize. Multiple inlet and outlet ports 90 and 92 may be used, if desired. It is contemplated that any readily available fluid may be used for heating, such as, for example, heated engine oil, heated coolant, heated air, or any other appropriate fluid. It is also contemplated that heater 64 may alternatively embody an electrical heater, a gas heater, or may be omitted, if desired.

INDUSTRIAL APPLICABILITY

The disclosed fluid handling system may be applicable to any combustion device, such as an engine or a furnace, where mechanical and/or corrosive damage from condensate is a concern. The disclosed fluid handling system may atomize and re-entrain collected condensate into a flow of air and/or exhaust before the condensate enters the combustion device. The disclosed fluid handling system may provide a simple and inexpensive means for simultaneously decreasing system degradation and improving the engine's emission characteristics. Operation of the disclosed fluid handling system will now be described.

Referring to FIG. 1, atmospheric air may be drawn into air induction system 14 via induction valve 22 to compressors 24, where it may be pressurized to a predetermined level before entering combustion chambers 20 of power source 10. Fuel may be mixed with the pressurized air before or after entering combustion chambers 20. This fuel-air mixture may then be combusted by power source 10 to produce mechanical work and an exhaust flow containing gaseous compounds and solid particulate matter. The exhaust flow may be directed from power source 10 to turbines 32 where the expansion of hot exhaust gases may cause turbines 32 to rotate, thereby rotating connected compressors 24 to compress the inlet air. After exiting turbines 32, the exhaust flow may be divided into two flows, including a first flow redirected back to air induction system 14 and a second flow directed to the atmosphere.

As the first exhaust flow moves through inlet port 40 of EGR system 18, it may be filtered by recirculation particulate filter 42 to remove particulate matter prior to communication with exhaust cooler 44. The particulate matter, when deposited on the mesh elements of recirculation particulate filter 42, may be passively and/or actively regenerated. It is contemplated that the particulate matter may additionally or alternatively be filtered prior to entering inlet port 40, if desired.

The flow of the reduced-particulate exhaust from recirculation particulate filter 42 may be cooled by exhaust cooler 44 and then directed through recirculation valve 46 to be drawn back into air induction system 14 by compressors 24. The recirculated exhaust flow may be mixed with the air entering combustion chambers 20. The exhaust, which is directed to combustion chambers 20, may reduce the concentration of oxygen therein and, in turn, lower the maximum combustion temperature within power source 10. The lowered maximum combustion temperature may slow the chemical reaction of the combustion process, thereby decreasing the formation of nitrogen oxides. In this manner, the gaseous pollution produced by power source 10 may be reduced. The lower peak combustion temperature may also result in improved efficiency of power source 10 by reducing heat rejection and chemical dissociation.

Prior to entering power source 10, the mixture of air and exhaust may be cooled using exhaust cooler 44 and/or air cooler 26 so as to improve the longevity, performance, and emission characteristics of power source 10. As the mixture of inlet air and recirculated exhaust gases flows through air cooler 26, and the other passageways of air induction system 14, heat may be transferred from the higher temperature air and exhaust mixture to the lower temperature walls and/or cooling fluid. Because the vapor pressure of the air and exhaust mixture may decrease with decreasing temperature, vapor from the cooling mixture may condense and begin to flow along the passageways of air induction system 14. This condensate may form corrosive substances. For example, sulfur dioxide and trioxide (SO2 and SO3) and nitrogen oxides (NOx) in the exhaust may react with condensed water vapor and form sulfuric and nitric acid. The acidic condensate may eventually corrode portions of air induction system 14 and power source 10. The liquid condensate may also cause mechanical damage and enhanced wear when it reaches power source 10 and interacts with the power source's moving parts. However, a finely dispersed vapor or aerosol may cool the combustion process within power source 10 and thereby help to reduce the amount of NOx produced by power source 10.

Condensation reduction device 27 may atomize and re-entrain condensed liquid into the air and exhaust mixture before the air and exhaust mixture enters power source 10. With reference to FIGS. 2 and 3, the air and exhaust mixture may enter inlet 66 of first body 56 and be conducted through first body 56 to inlet 71 of second body 58. After entering inlet 71 of second body 58, the air and exhaust mixture may pass through throat section 74, where the pressure of the mixture may decrease and the velocity of the mixture may increase relative to the pressure and the velocity of the air and exhaust gas mixture at an upstream location (e.g., at inlet 66 of first body 56). Thus, throat section 74 may create a pressure differential between the accelerated fluid internal to throat section 74 and the unaccelerated fluid external to throat section 74 (e.g., the fluid located in annular reservoir 62).

As the air and exhaust mixture passes through condensation reduction device 27, condensate flowing along internal surface 80 of first body 56 may collect in annular reservoir 62. Heater 64 may transfer thermal energy into the condensate in annular reservoir 62. The thermal energy may convert some of the liquid condensate into a gaseous phase and may further promote atomization of the condensate at throat section 74.

The gasses and atomized condensate may then be drawn from annular reservoir 62, through passageway 60 via the pressure differential at throat 74, and propelled or injected into the accelerated stream of air and exhaust. Introduction of the condensate into the accelerated flow at throat section 74 may, via changes in the pressure, temperature, velocity, and surface area of each condensate fluid particle, re-entrain, and revolatilize the condensate into the air and exhaust mixture. The mixture of air, exhaust, and re-entrained condensate may then pass through fluid passageway 33 to intake manifold 25 for subsequent combustion within power source 10.

Several advantages of the disclosed fluid handling system may be realized. In particular, the disclosed condensation reduction device may atomize and re-entrain liquid condensate into the flow of air and exhaust prior to entering the associated power source. The redispersion of the condensate may help prevent wear of the power source and corrosion within the disclosed air induction system downstream of the condensation reduction device. Furthermore, the disclosed fluid handling system may improve the emission characteristics of the power source by redispersing the condensate into the flow of air and exhaust rather than removing it.

It will be apparent to those skilled in the art that various modifications and variations can be made to the disclosed fluid handling system. Other embodiments will be apparent to those skilled in the art from consideration of the specification and practice of the disclosed fluid handling system. For example, the disclosed condensation reduction device could alternatively or additionally be located just downstream of the exhaust cooler to re-entrain exhaust condensate prior to mixing with air, if desired. It is intended that the specification and examples be considered as exemplary only, with a true scope being indicated by the following claims and their equivalents.

What is claimed is:

1. A condensation reduction device, comprising:

a first body positioned to receive a flow of exhaust from a power source;

a reservoir in fluid communication with the first body configured to collect condensate from at least the flow of exhaust; and a passageway in fluid communication with the reservoir configured to direct the collected condensate from the reservoir back into at least a portion of the flow of exhaust prior to the at least a portion of flow of exhaust entering the power source.

2. The condensation reduction device of claim 1, wherein the at least a portion of the flow of exhaust is first combined with air before being received by the first body.

3. The condensation reduction device of claim 2, further including a second body located downstream of the first body, wherein the second body includes an inlet portion extending into the first body, and the inlet portion of the second body has an outer surface spaced apart from an inner surface of the first body to form the reservoir.

4. The condensation reduction device of claim 3, further including a sealing member disposed between the first body and the second body to restrict the flow of fluid from the reservoir.

5. The condensation reduction device of claim 3, wherein the first body and the second body are integral.

6. The condensation reduction device of claim 3, further including a constriction in an inner diameter of the second body configured to draw condensate from the reservoir into the flow of air and exhaust.

7. The condensation reduction device of claim 6, wherein the passageway extends into the flow of air and exhaust such that the condensate is directed into a center portion of the flow of air and exhaust.

8. The condensation reduction device of claim 6, wherein an inlet of the passageway is located at a gravitationally lower portion of the reservoir.

9. The condensation reduction device of claim 6, further including an expanded section located downstream of the constriction, wherein an angle of expansion at the expanded section is approximately 6 degrees.

10. The condensation reduction device of claim 1, wherein the first and second bodies are tubular.

11. The condensation reduction device of claim 1, further including a heater associated with the reservoir to promote atomization of the collected condensate.

12. The condensation reduction device of claim 11, wherein the heater is configured to receive a fluid.

13. The condensation reduction device of claim 1, wherein the reservoir is annular.

14. A method of re-dispersing condensate, comprising:

generating a flow of exhaust;

mixing the flow of exhaust with air;

cooling the mixed flow of air and exhaust;

collecting condensate from the cooled and mixed flow of air and exhaust; and directing the collected condensate back into the cooled and mixed flow of air and exhaust prior to combustion of the cooled and mixed flow of air and exhaust.

15. The method of claim 14, wherein directing includes drawing the collected condensate from an outer periphery of the cooled and mixed flow of air and exhaust toward a center of the cooled and mixed flow of air and exhaust.

16. The method of claim 15, wherein drawing includes creating a pressure differential between the collected condensate and the cooled and mixed flow of air and exhaust.

17. The method of claim 14, further including heating the collected condensate to promote atomization of the collected condensate.

18. The method of claim 14, wherein:

collecting includes directing the condensate radially outward and blocking the condensate from flowing in the direction of the mixed and cooled flow of air and exhaust; and directing includes directing the condensate radially inward to the cooled and mixed flow of air and exhaust.

19. A fluid handling system, comprising:

a combustion engine configured to produce a mechanical power output and a flow of exhaust;

an exhaust passageway fluidly coupled to direct exhaust from the combustion engine to the atmosphere;

an induction passageway configured to direct air to the combustion engine;

a recirculation passageway configured to direct exhaust from the exhaust passageway into the induction passageway;

a cooler disposed in fluid communication with the induction passageway to cool air and exhaust directed to the engine; and a condensation reduction device having:

- a first body configured to receive the cooled air and exhaust;
- a reservoir in fluid communication with the first body to collect condensate from cooled air and exhaust; and
- a passageway in fluid communication with the reservoir to redirect the collected condensate into the flow of cooled air and exhaust.

20. The fluid handling system of claim 19, further including a constriction in an inner diameter of the second body configured to draw condensate from the reservoir into the flow of air and exhaust.

* * * * *